March 17, 1953 L. S. WILLIAMS 2,631,838
RIGIDLY MOUNTED SPRING COUNTERFORCE
Filed Sept. 22, 1947 2 SHEETS—SHEET 1
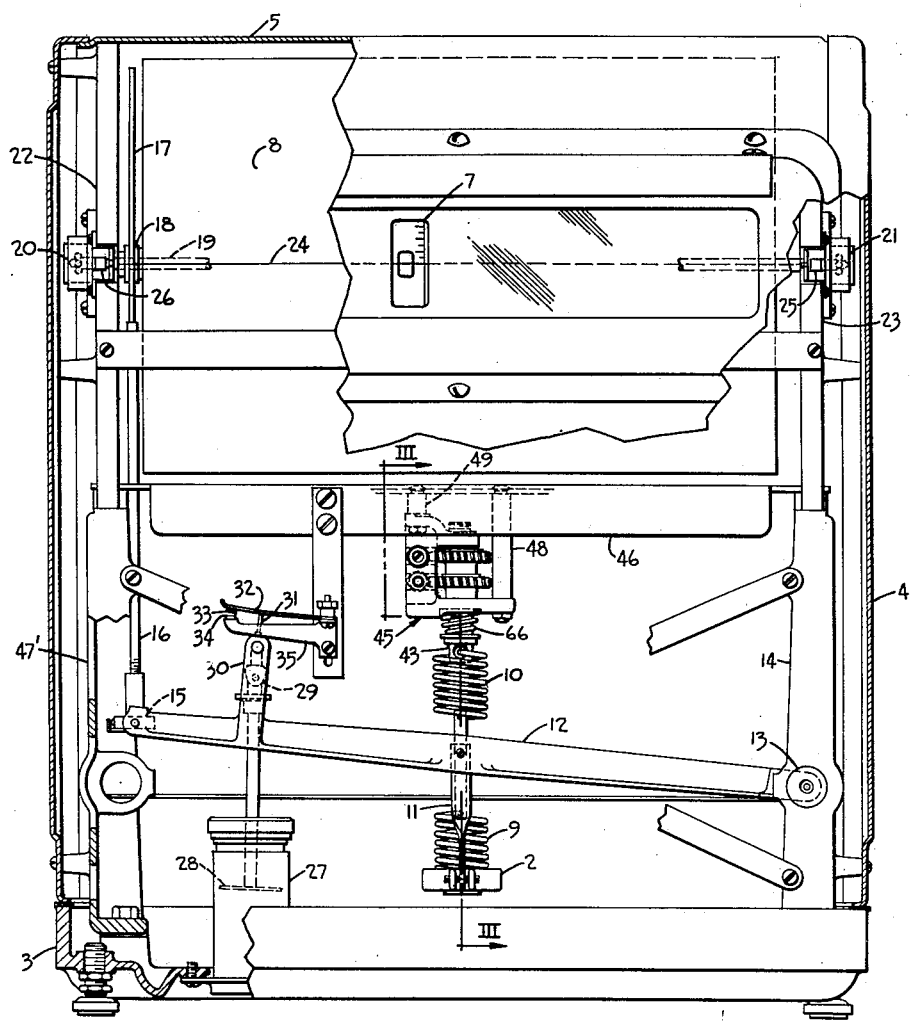
*Fig. II*
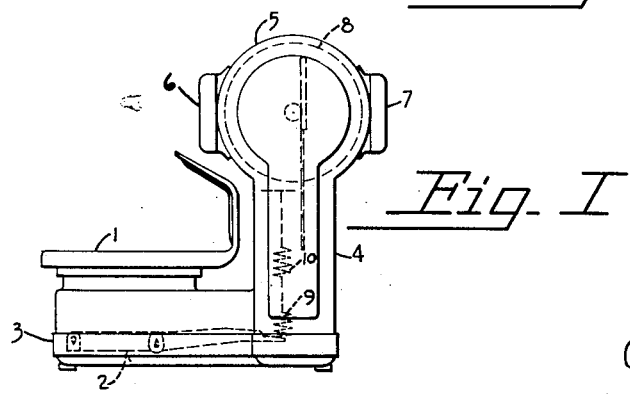
*Fig. I*
INVENTOR.
Lawrence S. Williams
BY
Marshall and Marshall
ATTORNEYS March 17, 1953 — L. S. WILLIAMS — 2,631,838
RIGIDLY MOUNTED SPRING COUNTERFORCE
Filed Sept. 22, 1947 — 2 SHEETS—SHEET 2
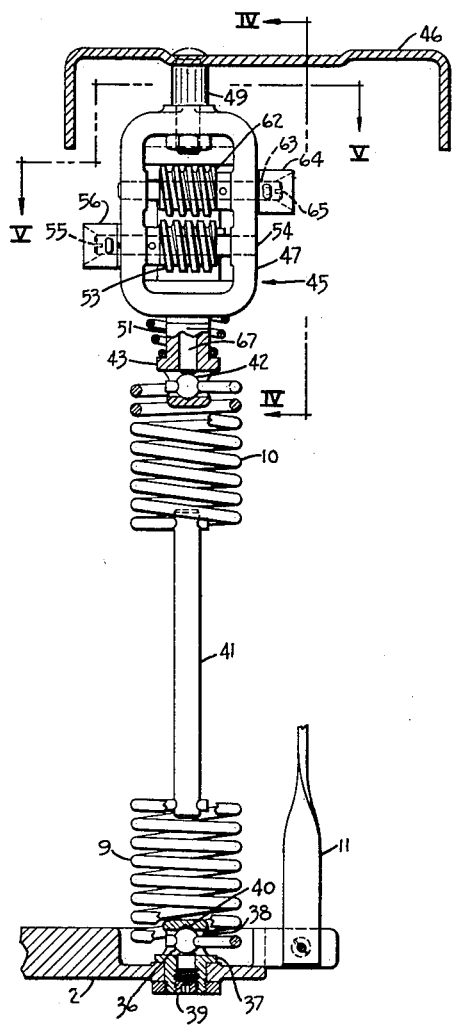
Fig. III
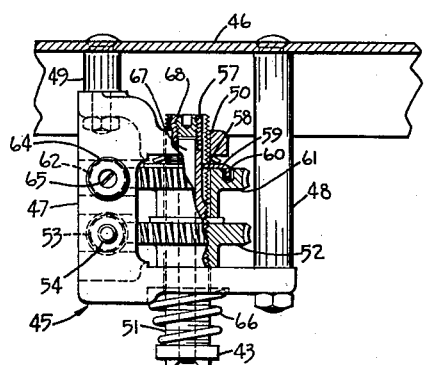
Fig. IV
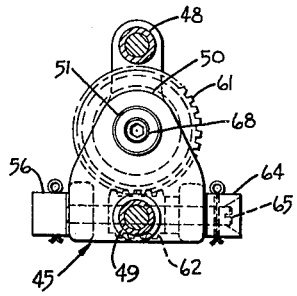
Fig. V
INVENTOR.
Lawrence S. Williams
BY
Marshall and Marshall
ATTORNEYS Patented Mar. 17, 1953

2,631,838

UNITED STATES PATENT OFFICE 2,631,838

RIGIDLY MOUNTED SPRING COUNTERFORCE

Lawrence S. Williams, Toledo, Ohio, assignor to Toledo Scale Company, Toledo, Ohio, a corporation of New Jersey Application September 22, 1947, Serial No. 775,473

9 Claims. (Cl. 265—63)

This invention relates to weighing scales and in particular to improvements in the mounting and adjustment of a spring that is used as a load counterbalancing element.

Weighing scales that employ springs for offsetting a load usually employ pivotal connections for supporting the spring and for connecting the spring to the load supporting mechanism. These pivotal connections, while they reduce or eliminate the transmission of bending moments to the spring, introduce a number of connections where slight dimensional changes are apt to take place during the use of the scale. Since the indication of load is derived from elongation of the spring as measured by the motion of a load receiver, or some element connected to it, with respect to the frame of the scale these small dimensional changes add or subtract from the elongation of the load counterbalancing spring and thus introduce errors into the weight indication. These pivotal connections have been considered necessary to eliminate any transmission of bending moment to the weighing spring because a spring subjected to a bending moment does not in general extend equal increments for equal increments of load.

The principal object of this invention is to provide a spring counterforce and connections employing clampable connections in lieu of pivotal connections.

Another object of the invention is to provide a mounting for a spring counterforce of a weighing scale that permits adjustment such that a minimum of bending moment is applied to the spring.

Another object of the invention is to provide means for adjusting the effective rate of the weighing spring by rotating one end of the spring with respect to the other end of the spring.

A still further object is to provide means for extending or contracting the spring as it is rotated so that the indication of load at a selected load will not be altered by the adjustment of the rate of the spring.

These and other objects and advantages are attained in a weighing scale incorporating the invention and which is illustrated in the accompanying drawings.

In the drawings:

Figure I is a side elevation of a weighing scale incorporating the improved load counterbalancing element.

Figure II is a rear elevation of the weighing scale with parts broken away and other parts shown in section.

Figure III is an enlarged vertical section taken substantially along the line III—III of Figure II.

Figure IV is a side elevation with parts broken away and parts shown in section of the upper mounting of the improved spring load counterbalancing element taken substantially along the line IV—IV of Figure III.

Figure V is a plan view with parts shown in section of the mounting and adjusting mechanism taken substantially along the line V—V of Figure III.

These specific figures and the accompanying description are intended merely to illustrate the invention but not to impose limitations on the claims.

The invention consists in rigidly attaching the ends of the load counterbalancing spring to a load applying mechanism and to a supporting mechanism by means of connections that permit universal adjustment between the spring and the connected mechanisms, and, further, providing the supporting mechanism with means for rotating the supported end of the spring and for raising or lowering the supported end of the spring either separately or in conjunction with the rotative adjustment.

The improved spring counterforce and the supports therefor eliminate all of the pivotal connections that are commonly associated with weighing springs and therefore precisely positions each of the elements contributing to the indication of load so that the uncertainty of load indication is materially reduced.

The bending moments that are applied to a rigidly supported spring are as constant in their effect as the extension of the spring so that they may be included in the calibration of the scale with assurance that the calibration will not change erratically.

The rigid mounting of the spring permits its rate (the incremental change in length for each increment of load) to be adjusted by merely rotating one end of the spring with respect to the other end. If the end of the spring is rotated in a direction tending to tighten the coils of the spring the rate of the spring increases. If on the other hand the end of the spring is rotated in a direction tending to open the coils the rate of the spring decreases. According to the invention, this effect is used to adjust the weighing scale for capacity. Furthermore, the upper end of the spring is raised or lowered without rotation to secure correct zero load indications. In weighing scales employing a platter or other load receiver the weighing spring is subjected to a load when there is no load on the load receiver. To permit adjustment of the rate of the spring without affecting the zero load indication the upper spring mounting is arranged so that the spring is extended or contracted simultaneously with the rotation.

Referring now to the accompanying drawings, the loads to be weighed are placed on a load receiver 1 which by means of a spider (not shown) is supported from load pivots of a lever 2 fulcrumed within a base 3 of the scale. A column 4 erected from one end of the base 3 is surmounted by a cylindrical chart housing 5 provided with a window 6 through which the operator may read the scale and a window 7 through which a customer may observe the weight indication. The indicia of weight and of computed value are printed on a cylindrical chart 8 that is mounted in the housing 5 and that is rotated through angles proportional to the loads applied to the load receiver 1. The deflection of the lever 2 in response to loads placed on the load receiver 1 is controlled by a weighing spring that preferably is divided into sections 9 and 10 one of which is rigidly attached to the lever 2 and the other of which is supported in the interior of the column 4.

Referring to Figure II, the train of mechanism for driving the chart 8 starts at the end of the lever 2 which is connected through a pivotally mounted strut 11 to a cross lever 12 one end of which is pivotally mounted in a bearing 13 secured in an upright 14 forming part of the column 4. The lever 12, which thus partakes of the movement of the lever 2, is connected at its free end through a gimbal connection 15 to a rack rod 16 the upper end of which carries a rack 17 cooperating with a pinion 18 on a shaft 19 carrying the chart 8. The shaft 19 is journalled in ball bearings 20 and 21 mounted in frames 22 and 23 respectively of the cylindrical chart housing 5. A thread 24 that is stretched between mounting clamps 25 and 26 carried in the frames 22 and 23 serves as a reading line against which the indicia of the chart 8 may be read.

Oscillations of the levers and chart following a disturbance or a change in load are controlled by a dashpot 27 having a plunger 28 the stem of which is pivotally connected to an arm 29 extending laterally from an upwardly directed lug 30 of the lever 12.

The upper end of the lug 30 also carries an insulating stem 31 that engages a spring switch leaf 32 when the scale is in its zero or unloaded condition. The spring leaf 32 carries an electrical contact 33 that cooperates with a contact 34 carried at the end of an arm 35 which contacts when closed complete an electrical circuit for electrical light bulbs contained within the chart housing 5 and positioned to illuminate the portions of the chart 8 that are visible through the windows 6 and 7.

Referring to Figure III, the lower end of the lower section 9 of the load counterbalancing spring is turned in to intersect the axis of the spring and at that point is provided with a generally spherical enlarged section 36 which may be either formed integrally with the wire of the spring or may be in the form of a drilled ball that is slipped over the spring wire and brazed or welded in place. A lower spring mounting 37 which is anchored into the lever 2 is provided near its upper end with a laterally drilled hole 38 to receive the generally spherical portion 36 of the spring 9. The mounting member 37 is drilled and tapped from the bottom so that a plug 39 may be screwed into this hole to clamp the generally spherical portion 36 against a conical crater 40 formed in the upper surface of the laterally bored hole 38. This clamping arrangement when loose permits universal adjustment of the lower end of the weighing spring with respect to the lever 2 and when it is clamped it prevents all relative motion between the lower end of the spring 9 and the lever 2. The spring sections 9 and 10 are joined by a connecting link 41 in the form of a rod having transverse holes at each end to receive inturned ends of the spring sections 9 and 10. The spring sections 9 and 10 are welded or brazed to the connecting link 41 and when they are so assembled the link 41 is substantially co-axial with the axis of the spring sections.

The upper end of the upper spring section 10 is provided with a spherical enlarged section or ball 42 which is clamped in an upper clamp 43 similar in structure to the lower mounting member 37.

The upper clamp 43 (see also Figure IV) is part of an adjusting mechanism 45 that is suspended from a bridge 46 spanning the space between the upright 14 and a similar upright 47' on the opposite side of the scale and located just beneath the cylindrical chart 8. The supporting and adjusting mechanism 45 includes a generally L-shaped frame 47 and lower horizontal leg of which receives the lower end of a strut 48 riveted to the bridge 46. The vertical portion of the L-shaped frame 47 is bifurcated throughout the greater portion of its length and is supported at its upper end on a stud 49 depending from the bridge 46. The frame 47 also includes an upper horizontally directed arm 50 positioned over and parallel to the lower horizontal leg of the L-shaped frame.

The upper spring clamp 43 forms the lower end of a threaded stem 51 that extends upwardly through clearance holes in the horizontal portions of the frame 47. The threaded stem 51 engages threads in the hub of a worm wheel 52 that rests on the lower horizontal leg of the L-shaped frame 47. The worm wheel 52 meshes with a worm 53 located within the vertical bifurcated portion of the L-shaped frame 47 and carried on a cross shaft 54 the end of which is provided with a screw driver slot 55. Axial movement of the shaft 54 is limited in one direction by the engagement of the hub of the worm 53 with the adjacent side of the opening in the bifurcating vertical section of the L-shaped frame 47 and is limited in the other direction by a collar 56 that is pinned to the shaft 54. The collar 56 is provided with a conical recess that serves to direct a screw driver into the slot 55. Rotation of the worm shaft 54 and worm 53 rotates the worm wheel 52 which, being in threaded engagement with the threaded stem 51 of the upper clamp 43, serves to raise or lower the upper end of the spring 10 and thus adjust the zero indication of the weighing scale.

In the region immediately above the worm wheel 52 the threaded stem 51 is provided with a keyway 57 to receive an inwardly directed ear 58 of a washer 59. The washer 59 has a downturned tab 60 engaged in a hole in the upper surface of a worm wheel 61 that encircles the threaded stem 51 and rests on the upper surface of the hub of the first worm wheel 52. The worm wheel 61 is not threaded but is merely slipped over the threaded stem 51. The worm wheel 61 meshes with a worm 62 that is located in the bifurcated portion of the L-shaped frame immediately above the worm 53. The worm 62 is mounted on a shaft 63 and is provided with a collar 64 for preventing longitudinal motion and for directing a screw driver into a screw driver slot 65.

Rotation of the worm 62 rotates the worm wheel 61 which acting through the keyed washer 59 rotates the threaded stem 51 thus producing rotation of the upper section 10 of the weighing spring.

A short helical spring 66 acting between a shoulder on the upper side of the clamp 43 and the lower surface of the horizontal portion of the L-shaped frame 47 urges the clamp 43 and the threaded stem 51 downwardly so that all possible backlash in the support for the clamp and weighing spring is removed.

The spherical portion 42 at the upper end of the section 10 of the weighing spring is secured in the clamp 43 by means of a rod 67 extending through an axial hole in the threaded stem 51 and held in clamping engagement with the spherical section 42 by a plug 68 threaded into the upper end of the threaded stem 51. As in the lower spring mounting the drill is allowed to run through the transverse hole and cut a conical crater into which the spherical enlargement of the spring fits.

In the improved weighing spring as illustrated in the drawings the sections of the spring are separated so that the lower section is attached directly to the lever of the scale and the upper section is attached to the rigidly located support. This is important in that it locates a flexible portion of the weighing spring at the lever itself and thus reduces to a minimum the lateral deflection of the weighing spring. It is also desirable that the rigid connection between the lower end of the spring and the lever be located at or slightly below the pivot line of the lever. The overall length of the spring is made as great as possible to keep the angular movement of the spring as small as possible.

The weighing spring is preferably constructed with a pair of relatively close wound coils rather than of one continuous spring having the same total number of turns but widely spaced because the longitudinal extension of a close wound coil is more nearly uniform with load throughout its operating range.

When the improved spring counterforce is employed in a weighing scale it is desirable that the bending moment exerted at each end of the spring be kept as small as possible. To accomplish this the spring is located so that its axis is perpendicular to the pivot line of the lever when the lever is in its half-capacity position. The ball and socket connection at each end of the spring permits (when the clamping screws are loosened) the spring to be manipulated so that when the scale is carrying half load the spring is subjected to tension forces only and there is no force tending to deflect the axis of the spring away from a line passing through its end connections. In normal operation the clamping screws are tight. Therefore, as the lever of the scale departs from its half-capacity position it imparts a bending moment to the lower end of the spring in addition to the extension or contraction of the spring. This bending moment has two effects on the indication of weight, the first of which is a direct resistance to angular movement of the lever away from its mid-capacity position. This effect acts substantially the same as increasing the rate of the weighing spring in resisting longitudinal extension or contraction. However, it is not quite the same because the angle through which the spring is bent at its connection to the lever does not vary linearly with the angle through which the lever moves. This results in a scale that shows errors in indication at the first and third quarters of the indicator travel even though the zero, half-capacity and full-capacity indications are linearly related. In the weighing scale illustrated in the drawings this error at the quarters of capacity is corrected by unbalancing the indicator chart so that the resulting force adds to or subtracts from the force of the load counterbalancing spring to compensate for the bending moment applied to the spring.

A second effect of the bending moment, which second effect is relatively small as affecting the weighing accuracy, is the lateral force that is applied to the lever as it departs from its mid-position. This lateral force tends to introduce errors at the first and third quarter of the indicator travel which errors are corrected by chart unbalance.

Rigidly mounting the ends of the weighing spring so that there is no possibility for the spring to shift in its mountings during operation removes practically all of the erratic error of the scale and also the difference between the indication of load when the load is increased as against the indication of the same load as the load is being decreased.

Various modifications in the attachment of the spring to its mountings and in the mechanism for supporting the spring may be made without departing from the spirit and scope of the invention.

Having described the invention, I claim:

1. In a weighing scale, in combination, a frame, a lever pivotally mounted in the frame and serving as a support for a load receiver, and a load counterbalancing element comprising a pair of helical axially stressed springs rigidly connected one to the frame and one to the lever, and a connecting member rigidly attached to each of the springs.

2. In a weighing scale, in combination, a helical axially stressed spring serving as a load counterbalancing element, means for applying load forces axially to one end of the spring and for preventing rotation of that end of the spring, and other means for supporting the spring and for rotatively adjusting the supported end of the spring with respect to the load receiving end of the spring.

3. In a weighing scale, in combination, a helical axially stressed spring that serves as a load counterbalancing member, means for applying load force axially to the spring and for preventing rotation of the load receiving end of the spring, mechanism for supporting the other end of the spring, said mechanism being adapted to rotate and elevate the attached end of the spring in related amounts whereby for a particular load the effective rate of the spring may be altered without moving the load receiving end of the spring.

4. In a weighing scale, in combination, a helical axially stressed spring that serves as a load counterbalancing member, means for applying load forces axially to one end of the spring and for preventing rotation of such load receiving end, a threaded stem rigidly attached to the other end of the spring, a support, means seated on the support and engaging the threaded stem for carrying the spring, and other means for angularly positioning the threaded stem.

5. In a weighing scale, in combination, a helical spring that serves as a load counterbalancing member, means for applying load forces to one end of the spring and for preventing rotation of such load receiving end, a threaded stem rigidly attached to the other end of the spring, said stem having a keyway, a support, and a pair of adjustable elements carried on the support, one of the elements engaging the thread of the stem for longitudinal adjustment of the stem and the other engaging the keyway for rotative adjustment of the stem.

6. In a weighing scale, in combination, a frame, a lever pivotally mounted in the frame, a helical axially stressed load counterbalancing spring, means for immovably anchoring one end of the spring to the lever, and means for rotatively adjusting and immovably anchoring the other end of the spring in adjusted position, such rotative adjustment serving to vary the effective diameter of the spring to adjust its elongation per unit of load.

7. In a weighing scale, in combination, a frame, a lever pivotally mounted in the frame, a helical load counterbalancing spring immovably anchored to the lever, a second helical spring immovably anchored to the frame, and a connecting member immovably connected to each spring for transmitting load force from one to the other.

8. In a weighing scale, in combination, a frame, a lever pivotally mounted in the frame, a helical axially stressed load counterbalancing spring immovably anchored to the lever, a member adjustably mounted in the frame and immovably anchored to the other end of the spring, said member being adjustable rotatively to twist the spring thereby varying its deflection per unit of load.

9. In a weighing scale, in combination, a frame, a lever pivotally mounted in the frame, a helical axially stressed load counterbalancing spring immovably anchored to the lever, a member adjustably mounted in the frame and immovably anchored to the other end of the spring, and means for adjusting said member axially and rotatively to vary the elevation of the spring in proportion to the change in strength produced by the rotative adjustment.

LAWRENCE S. WILLIAMS.

REFERENCES CITED

The following references are of record in the file of this patent:

UNITED STATES PATENTS

| Number | Name | Date |
|---|---|---|
| 272,699 | Ide | Feb. 20, 1883 |
| 978,026 | Jaenichen | Dec. 6, 1910 |
| 1,807,645 | Walker | June 2, 1931 |
| 1,953,664 | Walker | Apr. 3, 1934 |
| 2,074,983 | Flanagan | Mar. 23, 1937 |

FOREIGN PATENTS

| Number | Country | Date |
|---|---|---|
| 179,819 | Germany | Dec. 20, 1906 |